United States Patent [19]

van der Lely

[11] 4,340,118

[45] Jul. 20, 1982

[54] SOIL CULTIVATING IMPLEMENTS

[76] Inventor: Cornelis van der Lely, 7, Brüschenrain, Zug, Switzerland

[21] Appl. No.: 916,523

[22] Filed: Jun. 19, 1978

Related U.S. Application Data

[62] Division of Ser. No. 707,346, Jul. 21, 1976, Pat. No. 4,109,731.

[30] Foreign Application Priority Data

Jul. 24, 1975 [NL] Netherlands .......................... 7508821

[51] Int. Cl.³ .............................................. A01B 33/06
[52] U.S. Cl. ..................................... 172/49.5; 172/125
[58] Field of Search ................... 172/49.5, 49, 59, 68, 172/125, 522, 526

[56] References Cited

U.S. PATENT DOCUMENTS

| | | | |
|---|---|---|---|
| 2,741,173 | 4/1956 | White | 172/59 |
| 3,183,980 | 5/1965 | Howard | 172/125 X |
| 3,667,551 | 6/1972 | Lely | 172/111 |
| 3,779,320 | 12/1973 | Cantone | 172/60 |
| 3,885,633 | 5/1975 | Lely | 172/68 |
| 4,003,437 | 4/1977 | Lely | 172/59 |

Primary Examiner—Richard J. Johnson
Attorney, Agent, or Firm—William B. Mason

[57] ABSTRACT

A cultivating implement has a row of soil working members mounted along the length of an elongated portion of the implement frame. The members are rotatable about upwardly extending shafts that are geared to an overlying common driving shaft and an imput shaft drives the driving shaft through a change speed gear secured at one lateral side of the frame portion. The common driving shaft is located below the imput shaft and both shafts extend transverse to the direction of travel. The change speed gear includes interchangeable pinions housed within a box at the lateral side of the frame portion.

1 Claim, 6 Drawing Figures

SOIL CULTIVATING IMPLEMENTS

This is a division of application Ser. No. 707,346 filed July 21, 1976 now U.S. Pat. No. 4,109,731.

According to one aspect of the invention, there is provided a soil cultivating implement of the kind set forth, wherein said soil working members are arranged to be power-driven for rotation about said axes during operation of the implement and each of them is furnished with at least one freely rotatable cultivating tool, and wherein the construction and disposition of the soil crumbling member are such that, during operation, it will displace soil in two different directions from a location which is in register with an upwardly extending plane that passes between the axes of rotation of said two soil working members in a direction parallel to the direction of operative travel at such time.

Figure 1:
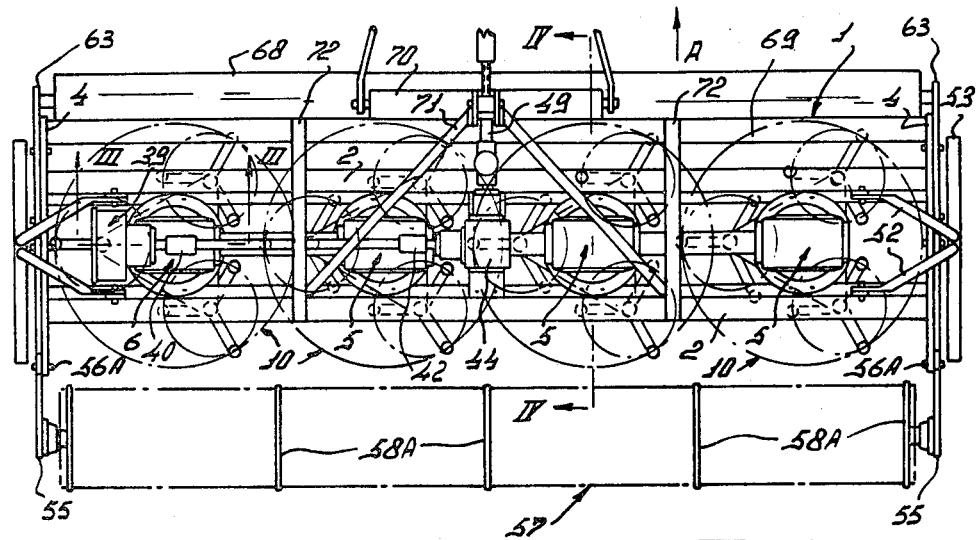
Figure 2:
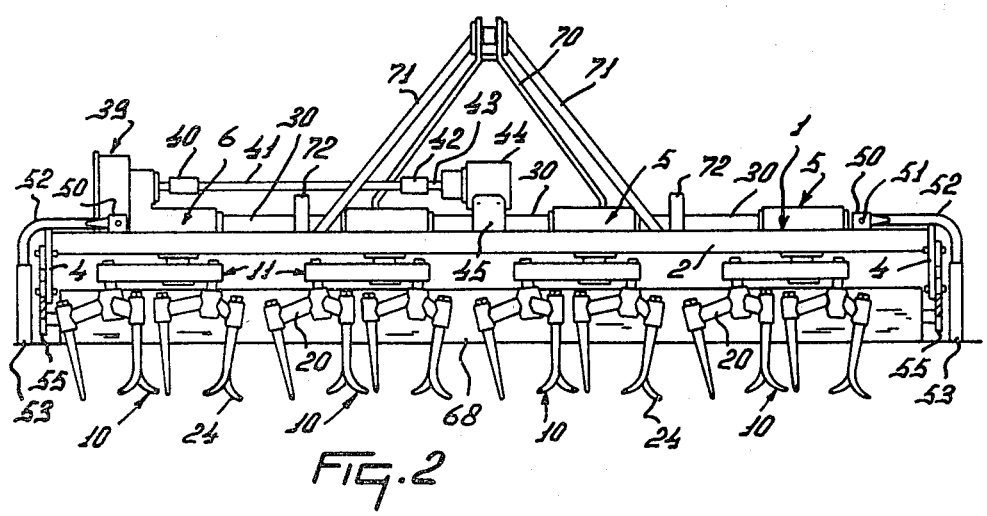
Figure 3:
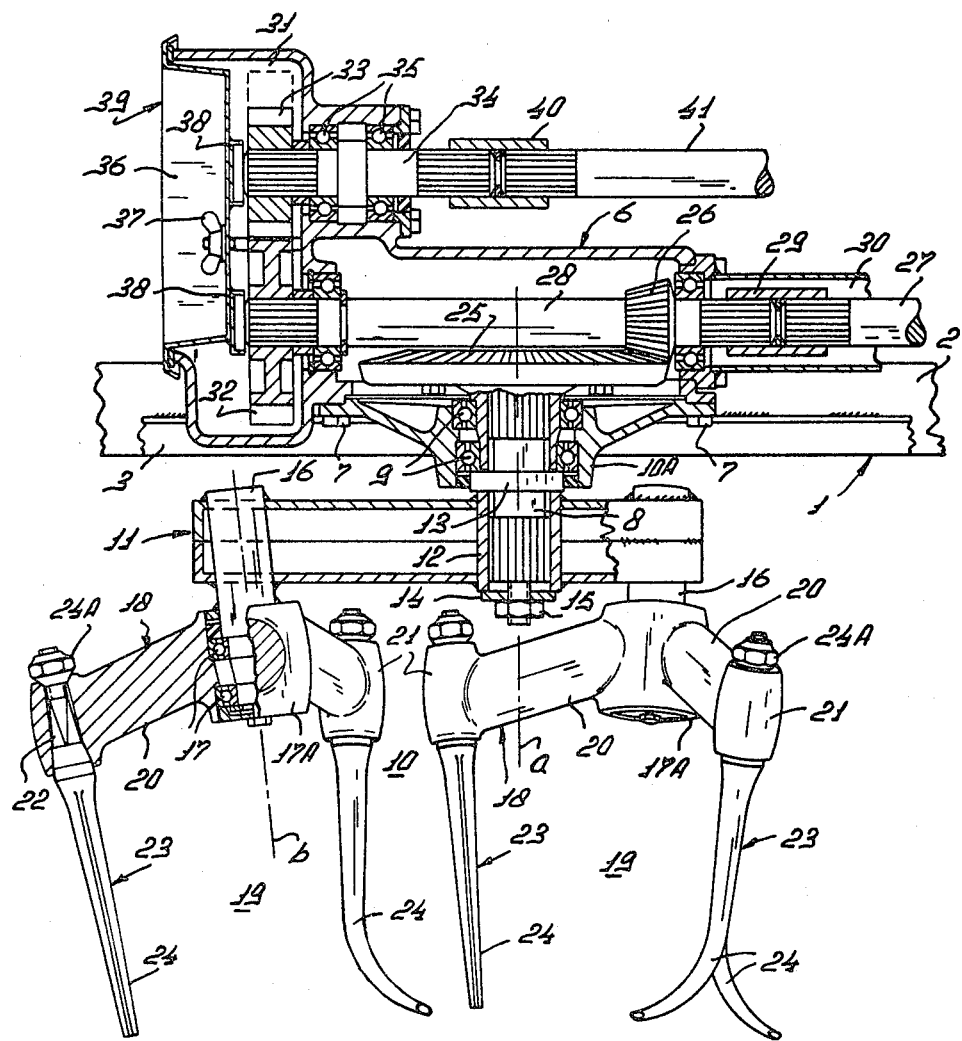
Figure 4:
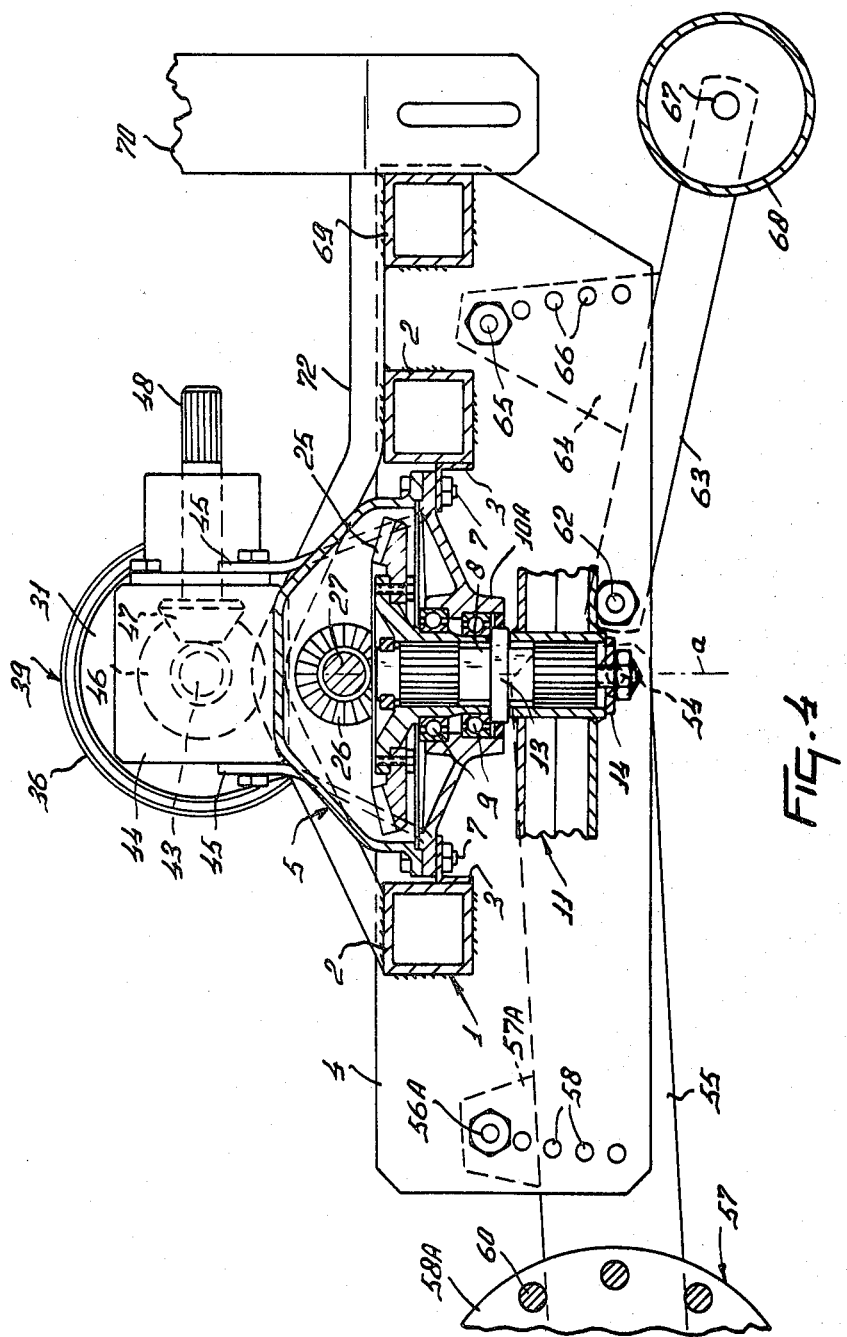
Figure 5:
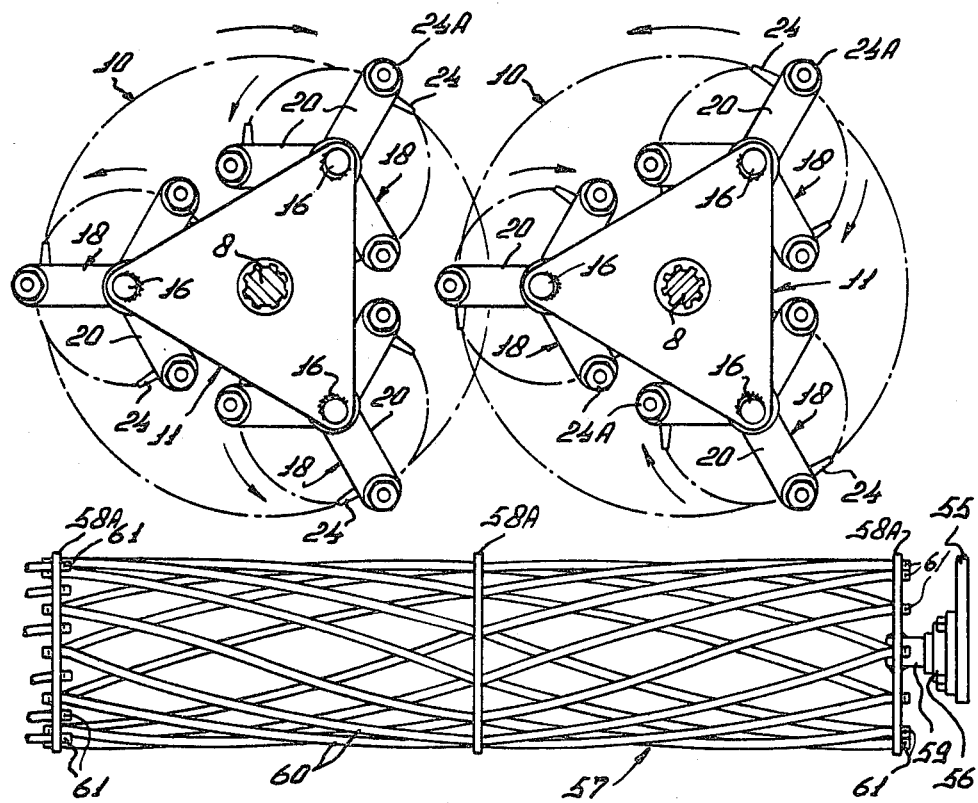
Figure 6:
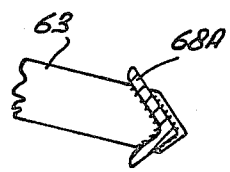

For a better understanding of the invention, and to show how the same may be carried into effect, reference will now be made, by way of example, to the accompanying drawings, in which:

FIG. 1 is a plan view of a soil cultivating implement in accordance with the invention, FIG. 2 is a rear view of the implement of FIG. 1 but with the omission of a soil crumbling member which is located at the back of the implement, FIG. 3 is a section, to an enlarged scale, taken on the line III—III in FIG. 1, FIG. 4 is a section, to an enlarged scale, taken on the line IV—IV in FIG. 1, FIG. 5 is a plan view, to an enlarged scale as compared with FIGS. 1 and 2, illustrating the co-operation between the two rotary soil working members of the implement together with their disposition relative to the soil crumbling member at the back of the implement, and FIG. 6 is a section, to the same scale as FIG. 4, illustrating an alternative embodiment of one part of the implement that is visible in cross-section in FIG. 4.

Referring to FIGS. 1 to 5 of the accompanying drawings, the soil cultivating implement that is illustrated therein comprises a frame that is generally indicated by the reference 1, said frame including two substantially horizontal spaced frame beams 2 that extend substantially parallel to one another in transverse, and usually in perpendicular, relationship with the intended direction of operative travel of the implement which is indicated in FIG. 1 of the drawings by an arrow A. Both frame beams 2 are of hollow formation and have a polygonal cross-section which it is preferred should be, as illustrated, a square one. Symmetrically opposed bars 3 that are of inverted L-shaped cross-section (see FIG. 4) have upright limbs which are rigidly secured to lower regions of upright front and rear surfaces of the corresponding beams 2 and substantially horizontal limbs which project towards one another from those two beams 2 at a level that is spaced above that of the bottoms of the two frame beams 2. Substantially vertically disposed side plates 4 that are both substantially parallel to the direction A interconnect the two frame beams 2 at the ends of the latter. The side plates 4 extend in front of, and behind, the two frame beams 2 with respect to the direction A and have the ends of the beams 2 rigidly secured to them at locations close to their uppermost edges. Three gear boxes 5 and one gear box 6 are secured by vertically disposed bolts 7 to the substantially horizontally disposed limbs of the two bars 3 at such positions that the four gear boxes 5 and 6 are spaced apart from one another at regular intervals.

Each of the four gear boxes 5 and 6 has a corresponding upwardly extending, and preferably substantially vertically disposed, shaft 8 rotatably mounted therein by means of upper and lower ball bearings 9 (FIG. 4) that are spaced apart from one another axially along the shaft 8 concerned. Each pair of ball bearings 9 is, in fact, arranged in a corresponding bearing housing 10A that is mounted at the bottom of the respective gear box 5 or 6. The longitudinal axis a of each shaft 8 is also the axis of rotation of a corresponding rotary soil working member that is generally indicated by the reference 10. Each of the four rotary soil working members 10 comprises a horizontally, or substantially horizontally, disposed support 11 which it is preferred should be, as illustrated in the drawings, of equilateral triangular configuration when seen in a direction parallel to the corresponding axis a. Each support 11 is provided with a center internally splined hub 12 which co-operates with matching external splines near the lowermost end of the corresponding shaft 8 which end projects from beneath the bottom of the bearing housing 10A of the gear box 5 or 6 concerned. Each hub 12 is enclosed between an overlying flange 13 of the corresponding shaft 8 and an underlying washer 14 that co-operates with a corresponding nut 15 (FIG. 3) screwed onto a short axially disposed screwthreaded stub shaft at the lowermost end of the shaft 8 under consideration. Each of the supports 11 comprises two identically shaped sheet metal parts or plates that are located one above the other (see FIG. 4), both said sheet metal parts or plates being rigidly welded to the external surface of the corresponding hub 12 at the center of the support 11 concerned. The three corners of each triangular support 11 are provided with three downwardly directed stub shafts 16 whose longitudinal axes b are in non-parallel relationship with the axis of rotation a of the corresponding rotary soil working member 10. As can be seen best in FIG. 3 of the drawings, the three stub shafts 16 that correspond to each support 11 are arranged so that their longitudinal axes b are downwardly convergent with the result that the upper ends of said stub shafts 16 are further apart from one another than are the lower ends thereof. The arrangement is, in fact, preferably such that, at the point of intersection between one of the axes a and any one of the corresponding three axes b, those axes a and b are inclined to one another at an angle of substantially 6°.

The portions of the three stub shafts 16 of each rotary soil working member 10 that project downwardly beneath the corresponding support 11 taper towards their extremities and each includes at least two right circular cylindrical shoulders which co-operate with the inner races of corresponding upper and lower ball bearings 17. The outer races of the axially spaced apart ball bearings 17 co-operate with the hub 17A of a corresponding freely rotatable cultivating tool 19. Each tool 19 has a support 18 which comprises the hub 17A concerned and three straight arms 20 which radiate from the hub 17A at 120° intervals around the axis b concerned but which are also inclined downwardly towards the ground surface from the hub 17A to their outermost ends. The outermost ends of the three arms 20 of each tool support 18 comprise three sleeve-like tine holders 21 in which are firmly, but releasably, received fastening portions 22 of three rigid soil working tines that are each generally indicated by the reference 23. The fastening portion 22 of each tine 23 is shaped to co-operate with the interior of the sleeve-like holder 21 which receives it and its extreme uppermost end is formed with a short screwthreaded portion that co-operates with a fastening nut 24A to keep the tine 23 in question firmly connected to its holder 21. The fastening nuts 24A preferably, but not essentially, include inserts designed to prevent vibration during the use of the implement from working them loose. Each tine 23 also includes a soil working portion 24 that is of downwardly tapering configuration and that initially extends rectilinearly downwards from its junction with the corresponding fastening portion 22. The lowermost end of each soil working portion 24 is bent over rearwardly in a substantially regularly curved manner with respect to the intended direction of operative rotation about the corresponding axis b of the cultivating tool 19 under consideration, the rear of each soil working portion 24 with respect to that direction being formed with a projecting rib 23A.

The uppermost end of each shaft 8 is provided, inside the corresponding gear box 5 or 6, with a crown wheel or bevel pinion 25 whose teeth are in driven mesh with those of a smaller bevel pinion 26 carried by a substantially horizontal shaft 27 or 28. The coaxial substantially horizontal shafts 27 and 28 extend transverse, and usually perpendicular, to the direction A and, as can be seen in FIG. 3 of the drawings, their adjacent splined ends are drivingly interconnected by a sleeve 29 formed with corresponding internal splines. It is, in fact, preferable to secure the sleeve 29 fixedly to one of the two shafts 27 and 28 so that it will then constitute a socket for the reception of the other co-operating shaft. The shaft 27 constitutes a common driving shaft for three of the four rotary soil working members 10 while the coaxial shaft 28 is a driving shaft for the fourth member 10 which is the member located at the left-hand end of the row of four members when the implement is viewed from the rear in the direction A (see FIGS. 1 and 2). Tubular casings 30 surround the shaft 27, and one end of the shaft 28, between the four gear boxes 5 and 6 for purposes of safety and cleanliness. The end of the shaft 28 that is remote from its coaxial connection to the shaft 27 is splined and projects into the hollow interior 31 of a change-speed gear that is generally indicated by the reference 39. Said splined end of the shaft 28 releasably receives the matchingly internally splined hub of a straight-toothed or spur-toothed pinion 32 whose teeth are in driven mesh with those of a similar, but smaller, pinion 33. The pinion 33 is releasably mounted, in an axially slidable manner, on the splined end of a shaft 34 which is located above the shaft 28 in parallel relationship therewith, the shaft 34 being rotatably supported by a pair of axially spaced apart ball bearings 35. The end of the shaft 34 that is remote from the pinion 33 projects outwardly above a top plate of the gear box 6 in a direction parallel to the common longitudinal axis of the shafts 27 and 28 and is splined for connection to a further shaft as will be discussed below. The hollow interior 31 of the change-speed gear 39 is closed by a circular internally dished cover 36, wing nuts 37 being provided so that said cover 36 can readily be removed from, and replaced in, its effective position. That surface of the base of the internally dished cover 36 that faces inwardly of the hollow interior 31 of the change-speed gear 39 is provided with two thrust members 38 which are so arranged as to prevent the hubs of the pinions 32 and 33 from becoming axially detached from the shafts 28 and 34 when the cover 36 is in its effective position. When the wing nuts 37 have been released and the cover 36 has been removed from the change-speed gear 39, the two pinions 32 and 33 can readily be axially slid off the splined ends of the two shafts 28 and 34 and can be interchanged in position or be exchanged for an alternative pair of co-operating straight-toothed or spur-toothed pinions that are not illustrated in the drawings. Any chosen one of a number of different transmission ratios between the shaft 34 and the shaft 28 can thus be readily obtained and FIG. 3 of the drawings illustrates, in broken lines, the substitution of a bigger pinion for the pinion 33, such bigger pinion than co-operating with a pinion that is smaller than the pinion 32 on the splined end of the shaft 28. Any one of a number of different speeds of rotation of the soil working members 10 can thus be employed without having to alter the initiating speed of rotation of the shaft 34 that is driven from the power take-off shaft of an agricultural tractor or other operating vehicle in a manner which will be described below. It will be seen from FIG. 3 of the drawings that a lower portion of the casing of the change-speed gear 39 is shaped to contain a supply of oil for the shafts 28 and 34 and their bearings and the co-operating pinions such as the pinions 32 and 33. It will be noted from FIGS. 1 and 2 of the drawings that the change-speed gear 39 is located close to one of the lateral sides of the frame 1 of the implement.

The splined end of the shaft 34 that projects from the casing of the change-speed gear 39 is in driven connection with the splined end of a coaxial shaft 41 by way of a matchingly internally splined sleeve 40 which, like the sleeve 29, may be arranged in the manner of a socket. The opposite splined end of the shaft 41 is coaxially connected by a further similar sleeve 42 (FIGS. 1 and 2) to the splined end of an output shaft 43 of a central gear box 44 of the implement. The gear box 44 is fastened by supports 45 to the two bars 3 that are carried by the frame beams 2. The output shaft 43 of the central gear box 44 is provided, inside that gear box, with a bevel pinion 46 (FIG. 4) whose teeth are in driven mesh with those of a smaller bevel pinion 47 that is carried by a rotary input shaft 48 of the gear box 44, said input shaft 48 having a splined end which projects forwardly from the front of the gear box in substantially the direction A. When the implement is in use, a telescopic transmission shaft 49 (FIG. 1) is employed to place the rotary input shaft 48 of the central gear box 44 in driven connection with the power take-off shaft of an agricultural tractor or other operating vehicle, said transmission shaft 49 being of a construction that is known per se and being provided at its opposite ends with universal joints.

Upright support lugs 50 (FIG. 2) are carried by the two bars 3 at equal distances from the opposite ends of the frame beams 2, said lugs 50 thus being arranged in two pairs with each pair carrying corresponding pivot pins 51 that are axially aligned in a direction that is substantially horizontally parallel to the direction A. Each pair of pivot pins 51 has a corresponding pair of arms 52 turnably mounted thereon, said arms 52 initially being outwardly convergent towards the adjacent end of the frame 1 and then being bent over downwardly through 90° alongside one another to carry corresponding shield plates 53 at the lower end of each pair of arms 52. The shield plates 53 are substantially vertically disposed in parallel relationship with one another and with the direction A and their lower edges are arranged for sliding motion in the direction A over the surface of the land that is worked by the implement during its operation. The pivotal mountings of the shield plates 53 allow them to turn upwardly and downwardly about the axes defined by the pins 51 to match undulations in the surface of the land that may be met with during operative travel in the direction A. The shield plates 53 act to minimise ridging of the soil at the margins of the broad strip thereof that is worked by the implement and to prevent any significant numbers of stones and the like from being flung laterally of the path of travel of the implement by its soil working members 10.

Each of the two side plates 4 is provided near its lower edge, and approximately midway along its length in the direction A, with a horizontal stub shaft 54 (FIG. 4) about which a corresponding arm 55 is upwardly and downwardly turnable. The arms 55 extend rearwardly from the stub shafts 54 alongside the side plates 4 and carry lugs 57A on their upper edges. Each side plate 4 is formed, near its rearmost edge, with a curved row of holes 58 that are equidistant from the axis defined by the substantially horizontally aligned stub shafts 54 and each of the two lugs 57A is formed with a single hole that can be brought into register with any chosen one of the corresponding row of holes 58. Bolts 56A are provided for horizontal entry through the holes in the lugs 57A and through the selected holes 58. When the bolts 56A are tightened, they maintain the arms 55 in chosen angular positions about the axis defined by the stub shafts 54 relative to the frame 1. The rearmost ends of the two arms 55 are provided with substantially horizontally aligned bearings 56 (FIG. 5) and stub shafts 59 at the opposite ends of a supporting and crumbling member in the form of a freely rotatably roller 57 are journalled in the two bearings 56. The roller 57 comprises a plurality, such as five, of regularly spaced apart substantially circular support plates 58A that all extend substantially vertically parallel to one another and to the direction A, the two support plates 58A which are located at the opposite ends of the roller 57 having the two stub shafts 59 welded in position, or otherwise rigidly mounted, at their centers. Twelve holes are formed close to the periphery of each support plate 58A, except for the center support plate 58A of the row thereof, the twelve holes being spaced apart from one another at regular 30° intervals around the centre-point of each support plate. The central support plate 58A of the row is also formed with similarly disposed holes but, in its case, there are twenty-four of those holes which are regularly spaced apart from one another at 15° intervals around the centerpoint of the support plate.

Two groups of elongated elements 60 are provided, each group comprising twelve of the elongated elements 60, individual ones of which are entered through twelve alternate holes of the twenty-four holes in the central support plate 58A of the roller 57 and through the twelve holes in each of the two (in the embodiment that is being described) support plates 58A that are located in regularly spaced apart relationship at one side of the central support plate 58A. Each elongated element 60 extends in the same general direction as the axis of rotation of the ground roller 57 but, as will be evident from FIG. 5 of the drawings, not truly parallel to that axis of rotation. Each individual element 60 is preferably of solid rod-like formation, as illustrated in FIG. 4, although it is possible, as an alternative, for it to be of hollow tubular formation. Each individual element 60 extends throughout substantially, although not exactly, half of the axial length of the roller 57, the twelve elongated elements 60 of one group overlapping the twelve of the other group at the central support plate 58A where the elements 60 of one group are entered through twelve of the twentyfour holes in that support plate while the twelve elongated elements 60 of the other group are entered alternately through the other twelve holes therein. The central support plate 58A thus co-operates supportingly with both of the two groups of twelve elongated elements 60. The elongated elements 60 are not a tight fit in the holes in the support plates 58A and the ends of those elements 60 are movable axially to a limited extent in the holes in the particular plates 58A with which said ends co-operate, small transverse pins 61, that may conveniently be so-called "safety" pins which are of a construction that is known per se, being entered through transverse bores in the extreme opposite ends of all of the elements 60 to prevent those ends from becoming detached axially from the support plates 58A with which they co-operate.

FIG. 5 of the drawings shows that each of the twelve elongated elements 60 of one group thereof is formed at substantially its midpoint, and thus at a location substantially in register with one of the five support plates 58A that are provided in the embodiment that is being described, with a sharp angular bend or "kink". The point of each angular bend or kink is orientated rearwardly with respect to the direction in which the roller 57 will rotate during operation of the implement and it will also be seen from FIG. 5 of the drawings that, from the angular bend or kink in each element 60 that is located substantially in one of the circumferential holes in one of the support plates 58A, that element 60 is wound helically around the axis of rotation of the roller 57 in a symmetrically opposite manner from the support plate 58A that coincides with the sharp angular bend or kink therein towards the two immediately neighbouring plates 58A of the row thereof. FIG. 5 also shows that the support plate 58A which is illustrated therein and that coincides with the sharp angular bends or kinks in the twelve elongated elements 60 of one group is in substantial register, in the direction A, with a substantially vertical plane that is parallel to the direction A and that passes midway between the axes of rotation a of two immediately neighbouring soil working members 10 that revolve in opposite directions during the use of the implement. Although not essential, it is preferred that each of the twenty-four elongated elements 60 should be of circular cross-section. Only one of the two groups of elongated elements 60 is illustrated in detail in FIG. 5 of the drawings but it is noted that the other group of twelve elements 60, which is located to the left of the illustrated group, is symmetrically identical in construction and arrangement and is so disposed that the support plate 58A which coincides in position with the sharp angular bends or kinks in the twelve elements 60 of the corresponding group is substantially coincident with a substantially vertical plane that extends parallel to the direction A and that passes midway between the axes of rotation a of the other co-operating pair of soil working members 10 which revolve in opposite directions during the use of the implement.

Each of the two side plates 4 of the frame 1 is provided close to its lowermost edge, but at a location a short distance forwardly from the neighbouring stub shaft 54A with respect to the direction A, with a substantially horizontal stub shaft 62 about which a corresponding arm 63 (FIG. 4) is turnable upwardly and downwardly alongside the immediately adjacent plate 4. The arms 63 extend forwardly with respect to the direction A from the aligned stub shafts 62 and their upper edges are provided with corresponding brackets 64 which are formed, near their uppermost extremities, with corresponding single holes. Each side plate 4 is formed towards its leading edge with a curved row of holes 66 that are equidistant from the axis defined by the aligned stub shafts 62, the single holes in the brackets 64 being at the same distance from said axis. The single holes in the brackets 64 can be brought into register with any chosen ones of the holes 66 in the corresponding rows and bolts 65 are provided for horizontal entry through those aligned holes so that, when tightened the bolts 65 maintain the arms 63 in chosen angular positions about the axis defined by the stub shaft 62 relative to the frame 1. The two arms 63 are provided close to their leading free ends with horizontal axle pins 67 between which a levelling member in the form of a further roller 68 is mounted in a freely rotatable manner. The roller 68, like the roller 57, extends throughout substantially the whole of the working width of the four soil working members 10. FIG. 6 of the drawings illustrates the provision of an alternative form of levelling member that is afforded by a non-rotary bar 68A of L-shaped cross-section, the opposite ends of the bar 68A being welded or otherwise rigidly secured to the two arms 63 very close to the leading ends of those two arms. It will be seen from FIG. 6 of the drawings that the upper limb of the bar 68A is of greater extent than the lower limb and that said two limbs project rearwardly and upwardly and rearwardly and downwardly, respectively, relative to the direction A, from the junction between them.

A further frame beam 69 (FIG. 4) extends parallel to the two frame beams 2 at a location in front of the leading one of those two beams 2 with respect to the direction A, the further frame beam 69 being disposed at the same horizontal level as the two frame beams 2 and being of the same construction as those two beams. The opposite ends of the further frame beam 69, like the opposite ends of the frame beams 2, are both welded or otherwise rigidly secured to the two substantially vertical side plates 4 of the frame 1. A coupling member or trestle 70 of generally triangular configuration is rigidly secured to the front of the further frame beam 69 at a location midway between the planes of the two side plates 4. The coupling member or trestle 70 is constructed and arranged for connection to the three-point lifting device or hitch at the rear of an agricultural tractor or other operating vehicle in a manner which is generally known per se but which can be seen, in outline, in FIG. 1 of the drawings. The apex of the coupling member or trestle 70 is connected by two downwardly and rearwardly divergent tie beams 71 to two locations that are disposed towards the rearmost ends of two frame beams 72 that both extend substantially parallel to the direction A at positions between the side plates 4 in rigidly interconnecting relationship with the transverse frame beams 2 and 69. As can be seen in FIG. 4 of the drawings, portions of the frame beams 72 are arched upwardly so as to pass over the top of the tubular casings 30 of the common driving shaft 27.

In the use of the soil cultivating implement that has been described with reference to FIGS. 1 to 5 of the drawings or with reference to those Figures as modified by FIG. 6 of the drawings, the coupling member or trestle 70 is connected to the three-point lifting device or hitch at the rear of an agricultural tractor or other operating vehicle and the rotary input shaft 48 of the central gear box 44 is placed in driven connection with the power takeoff shaft of the same tractor or other vehicle by way of the known telescopic transmission shaft 49 which has universal joints at its opposite ends. The speed of rotation of the four members 10 in response to a substantially standard speed of rotation applied to the input shaft 48 is dependent upon the pinion arrangement, as discussed above, in the chang speed gear 39 and factors to be taken into consideration in choosing an appropriate speed include the nature and condition of the soil that is to be cultivated and the degree of fineness thereof that is required after treatment. The depth of penetration of the tines 23 into the soil will be principally dependent upon the level of the axis of rotation of the roller 57 that is chosen relative to the level of the frame 1, said level being dictated by the angular positions of the arms 55 that are chosen about the axis defined by the stub shafts 54. Once this adjustment has been made, the levelling member that is afforded by the roller 68 or bar 68A is adjusted in a similar manner to bring it substantially into contact with the ground surface. As the implement advances in the direction A over the soil that is to be worked thereby, the drive transmission that has been described will cause the four soil working members 10 to be positively rotated around the corresponding axes a in the directions that are indicated by the large arrows at the top of FIG. 5 of the drawings, the other two members 10 revolving in symmetrically identical directions. Simultaneously, the cultivating tools 19 will rotate in the directions that are indicated by smaller arrows in FIG. 5 of the drawings in a more or less continuous manner because, at any given instant, the whole of each tool 19 is being positively displaced around the corresponding axis a and will, except momentarily, have two tines 23 located at one side of the corresponding axis b and one tine 23 located at the other side thereof. Since the axes b are not in parallel relationship with the corresponding axes a, those tines 23 that, at any instant, are further from the corresponding axis a than is their own individual axis of rotation b, will have their soil working portions 24 entered more deeply into the soil than will any tine 23 that is closer to the corresponding axis a than is its respective axis b. Moreover, as will be evident from FIGS. 3 and 5 of the drawings, any such former tine 23 will have the lowermost bent-over end of its soil working portion 24 orientated generally forwardly with respect to the direction of rotation of the whole member 10 concerned about its axis a whereas any such latter tine 23 will have the lower bentover end of its soil working portion 24 orientated generally rearwardly relative to the direction of rotation of the corresponding whole soil working member 10. These factors cause the tools 19 to revolve more or less continuously in the directions indicated by the small arrows in FIG. 5 but it will be realised that, should at least one tine 23 of one of the tools 19 meet a firmly embedded stone or other substantially immovable obstacle, rotation about the axis b concerned would momentarily cease or might even be reversed for a very short time until the obstacle was avoided.

The tools 19 of the successive members work overlapping strips of soil so that, in effect, a single broad strip of land is worked by the implement. The supporting and crumbling member that is afforded by the roller 57 comprises a group of the elongated elements 60 in respect of each of the two pairs of co-operating members 10 in which the two members of the pair revolve in opposite directions as illustrated for one such pair in FIG. 5 of the drawings. The level of the axis of rotation of the roller 57 which is chosen relative to that of the frame 1 is the principal factor which governs the maximum depth of penetration of the tines 23 into the soil which is possible. Since the elongated elements 60 of each group have sharp angular bends or kinks midway along their lengths, the points of said bends or kinks being orientated rearwardly with respect to the operative direction of rotation of the roller 57 and said bends or kinks being located in register with the regions between the pairs of co-operating members 10 in which soil displaced thereby is principally delivered rearwardly therefrom, the elements 60 tend to displace such delivered soil further in two different directions along the symmetrically oppositely wound portions of the elements 60 that are to be found at opposite sides of the support plates 58A which coincide in position with the bends or kinks in the elements 60. The two different directions in which such soil is displaced by each group of elements 60 are substantially, but not necessarily exactly, opposite directions and this construction and arrangement has the effect of greatly reducing, if not substantially eliminating, ridges of soil which would otherwise tend to be formed in line, in the direction A, with the soil delivery regions between the co-operating pairs of members 10. A very uniformly worked soil surface is thus left after the passage of the implement and, since the elements 60 of the roller 57 are displaceable axially to a limited extent lengthwise along the roller 57, they are capable of matching any small discontinuities in the ground surface very readily.

The downwardly convergent arrangement of the axes of rotation b of the three tools 19 of each member 10 is such as to ensure effective and more or less continuous ground-driven rotation of the tools 19 around the axis b in conjunction with the bent-over lower ends of the soil working portions 24 of the tines 23. This arrangement also ensures that the bent-over ends of the soil working portions 24 of the tines 23 are close to one another at locations in substantial alignment with the axes of rotation a of the members 10 themselves, said portions of the tines 23 being closer to one another than are the fastening portions 22 of the tines 23 of different tools 19 of the same member 10. The arrangement of the change-speed gear 39 close to one end of the row of soil working members 10 ensures that it is readily accessible when an interchange or exchange of pinions therein is necessary and this ready accessibility is particularly welcome when a further agricultural implement, tool or machine is connected to the rear of the soil cultivating implement for use therewith because such further implement, tool or machine would greatly impede access to a rear-mounted change-speed gear. The particular construction and arrangement of the shafts 28 and 34 which has been described, and which is illustrated in the drawings, considerably facilitates the assembly of the implement and the work that is required when any part of the drive transmission requires replacement.

Although various features of the soil cultivating implement that have been described and that are illustrated in the accompanying drawings will be set forth in the following claims as inventive features, it is emphasised that the invention is not necessarily limited to those features and that it includes within its scope each of the parts of the soil cultivating implement that has been described, and/or that is illustrated in the accompanying drawings, both individually and in various combinations.

What we claim is:

1. A soil cultivating implement comprising a frame and a plurality of soil working members arranged in a row and rotatably mounted along the length of a transverse, elongated portion of said frame, said members being in driven arrangement with each other and rotatable about upwardly extending axes defined by respective shafts and driving means connected to rotate said members, said driving means including an upper rotary shaft and a lower driving shaft that extend horizontally transverse to the direction of implement travel, said rotary shaft having an outer lateral end that engages said driving shaft through a change speed gear arrangement, said driving shaft including a coaxial shaft segment that drives an outer one of said members, said driving shaft comprising a common driving shaft for the remaining soil working members that extends in transverse alignment with said row, as seen in plan, and adjacent the respective upwardly extending shafts of said members, said speed gear arrangement comprising interchangeable gears arranged one above the other in a gear box secured adjacent one lateral side of the frame portion, said rotary driving shafts being supported above the length of said elongated frame portion.

* * * * *